United States Patent
Kassner (10) Patent No.: US 11,455,043 B2
(45) Date of Patent: Sep. 27, 2022

(54) METHOD AND SYSTEM FOR STAGING A CHANGE IN OPERATING MODE OF A TRANSPORTATION VEHICLE

(71) Applicant: VOLKSWAGEN AKTIENGESELLSCHAFT, Wolfsburg (DE)

(72) Inventor: Astrid Kassner, Berlin (DE)

(73) Assignee: Volkswagen Aktiengesellschaft

( * ) Notice: Subject to any disclaimer, the term of this patent is extended or adjusted under 35 U.S.C. 154(b) by 185 days.

(21) Appl. No.: 16/842,937

(22) Filed: Apr. 8, 2020

(65) Prior Publication Data
US 2020/0326782 A1    Oct. 15, 2020

(30) Foreign Application Priority Data
Apr. 9, 2019  (DE) .................. 10 2019 205 097.2

(51) Int. Cl.
*G06F 3/01*    (2006.01)
*B60W 50/10*    (2012.01)
(Continued)

(52) U.S. Cl.
CPC .............. *G06F 3/017* (2013.01); *B60K 35/00* (2013.01); *B60W 50/10* (2013.01); *B60W 50/14* (2013.01);
(Continued)

(58) Field of Classification Search
CPC ... G06F 3/017; B60K 35/00; B60K 2370/146; B60K 37/06; B60K 2370/1438; B60K 2370/152; B60K 2370/157; B60K 2370/172; B60K 2370/175; B60K 2370/1876; B60K 2370/52; B60W 50/10;
(Continued)

(56) References Cited

U.S. PATENT DOCUMENTS 8,924,150 B2    12/2014  Tsimhoni et al.
9,103,691 B2    8/2015   Wäller et al.
(Continued)

FOREIGN PATENT DOCUMENTS

DE    102008051757 A1    5/2009
DE    102011121746 A1    7/2012
(Continued)

OTHER PUBLICATIONS

Mazda Motor Corporation,Mazda6 owner's manual, Apr. 2018, p. 5-66 to 5-120 4-164 and 4-167 (Year: 2018).*

*Primary Examiner* — James J Lee
*Assistant Examiner* — Alexander George Matta
(74) *Attorney, Agent, or Firm* — Barnes & Thornburg, LLP (57) ABSTRACT

A method and system for enacting a change of operating modalities of a transportation vehicle. The method includes at least one display device, which at least partially includes a screen, operated in the transportation vehicle. The at least one display device has at least two operating modes for operator control by a user. A triggering signal to the at least one display device is automatically provided. The triggering signal is triggered by at least one trigger event, is provided directly or indirectly by the transportation vehicle, and triggers a change from a first operating mode to a second operating mode. The change is at least partially indicated to the user by at least one operator alerting signal.

26 Claims, 11 Drawing Sheets

(51) Int. Cl.
  *B60W 50/14* (2020.01)
  *B60K 35/00* (2006.01)
(52) U.S. Cl.
  CPC .. *B60K 2370/146* (2019.05); *B60W 2050/143* (2013.01)
(58) Field of Classification Search
  CPC ........... B60W 50/14; B60W 2050/143; B60W 50/08; B60W 2050/146
  See application file for complete search history.

(56) References Cited

U.S. PATENT DOCUMENTS

| | | | |
|---|---|---|---|
| 10,691,122 B2* | 6/2020 | Kadoya | B60K 35/00 |
| 2006/0187196 A1 | 8/2006 | Underkoffler et al. | |
| 2011/0154268 A1 | 6/2011 | Trent, Jr. et al. | |
| 2015/0186031 A1 | 7/2015 | Mere et al. | |
| 2015/0212584 A1* | 7/2015 | Aoyama | G06V 20/59 345/173 |
| 2016/0082867 A1 | 3/2016 | Sugioka et al. | |
| 2016/0246478 A1* | 8/2016 | Davis | G06F 3/04817 |
| 2017/0024106 A1 | 1/2017 | Wild | |
| 2017/0083197 A1 | 3/2017 | Lee et al. | |
| 2017/0277271 A1 | 9/2017 | Entenmann | |
| 2018/0222490 A1* | 8/2018 | Ishihara | B60W 50/14 |
| 2018/0244174 A1 | 8/2018 | Tan | |
| 2018/0304771 A1 | 10/2018 | Wolf et al. | |
| 2020/0171950 A1* | 6/2020 | Wieczorek | B60N 2/0244 |
| 2020/0346546 A1* | 11/2020 | Oh | G06F 3/017 |

FOREIGN PATENT DOCUMENTS

| | | |
|---|---|---|
| DE | 102013022035 A1 | 6/2015 |
| DE | 102016001998 A1 | 8/2017 |
| DE | 102017113781 A1 | 12/2018 |
| EP | 2923884 A1 | 9/2015 |
| EP | 3095635 A2 | 11/2016 |
| KR | 20140128812 A | 11/2014 |
| WO | 2018057663 A1 | 3/2018 |

* cited by examiner

METHOD AND SYSTEM FOR STAGING A CHANGE IN OPERATING MODE OF A TRANSPORTATION VEHICLE

PRIORITY CLAIM

This patent application claims priority to German Patent Application No. 10 2019 205 097.2, filed 9 Apr. 2019, the disclosure of which is incorporated herein by reference in its entirety.

SUMMARY

Illustrative embodiments relate to a method for enacting a change of operating modalities of a transportation vehicle and to a system for enacting a change of operating modalities of a transportation vehicle.

BRIEF DESCRIPTION OF THE DRAWINGS

Disclosed embodiments are explained below with reference to the associated drawings, in which.

DETAILED DESCRIPTION

Vehicles, in particular, transportation vehicles, have in the interior numerous operating elements for the user. These operating elements are primarily intended in this instance for the driver of the transportation vehicle and are increasingly also provided as operable display devices. In this connection, applications in the sense of touch control, for example, are already known from the prior art. With the manual driving of today, the driver has a seat position that enables him, for example, to reach a central display or a corresponding screen of a display device, and consequently a touch control. Future driving modes, for instance, in the automatic driving mode (Levels 4 and 5), make it possible for the driver's seat to be put back, to enable a user to have greater comfort. Touch control of the central display is then no longer possible. In this position of the seat away from the display, for many operating actions a different kind of operator control is appropriate, for example, by gestures by the user. A precondition for successful operator control of the central display by the driver in the various driving modes is that it illustrates to him how he can operate the central display at the time and which contents are then available. Approaches to solving the problem addressed in cases of similar applications, or in a wider or different context, are disclosed in the prior art, the issues raised here only being dealt with partially, and not directly in the context described here.

Thus, EP 3 095 635 A2 discloses a transportation vehicle display device and a method for controlling the same. The display device in this case comprises a display and a controller, which is configured to monitor a manipulation variable of a driving manipulation device provided on a transportation vehicle, to select any desired driving mode that corresponds to the manipulation variable of the driving manipulation of the device from a multiplicity of predetermined driving modes and to control the display to display various items of information according to the multiplicity of driving modes. When a corresponding driving mode is selected, the controller reduces the amount of driving information displayed on the display and increases the amount of comfort information displayed on the display.

US 2011/0154268 A1 also discloses a method and apparatuses for implementing gesture command recognition functionality. In this case, the apparatuses can operate in a pointing mode and in an enhanced gesturing mode. In the enhanced gesturing mode, the apparatuses may cause associated actions in response to recognizing sliding inputs as gesture commands. The gesture commands may be selectively assigned to actions based on localities. The apparatuses may present overlays with information content independent of gesture command recognition. The apparatuses may change the appearance of visual representations of sliding inputs in response to recognizing the sliding inputs as gesture commands.

WO 2018/057663 A1 also discloses a gesture-based control of autonomous transportation vehicles. In this connection, a triggering condition for initiating a gesture-based interaction session with an occupant of a transportation vehicle is detected. A display is populated with representations of one or more options for operations associated with the transportation vehicle. Based at least in part on an analysis of one or more signals, for example, gestures, generated by the occupant, a particular option is selected for implementation. An indication that the particular option has been selected is provided, and an operation corresponding to the particular option is initiated.

US 2017/0277271 A1 also discloses an operating device and a method for operating functions of a vehicle, in particular, a transportation vehicle. These comprise a gesture detection device allowing the detection of gestures carried out by a person in an interior of the transportation vehicle for operating the functions. The gesture detection device has a multitude of operation zones in the interior, each zone being assigned to one of the functions and being selectable for operating the respective function by a gesture assigned to the respective operation zone.

The document US 2017/0083197 A1 also discloses an apparatus and a method for providing a user interface. The apparatus for providing a user interface provides a first user interface mode, and can switch to a second user interface mode if it receives a user command instructing it to switch its mode to the second user interface mode, which has a different user command input method from the first user interface mode. In the switching process, the apparatus for providing a user interface can reset a recognition pattern so as to classify less user input types than are classified in the first user interface mode.

The issues referred to above are not dealt with directly and fully in the solutions to the problem addressed that are presented. There is no direct support for a user, in particular, during a transitional mode in the case of different application scenarios.

Disclosed embodiments provide a method and a system that enable a user to display automatically respective operating possibilities of the transportation vehicle in the case of different applications during use.

In a disclosed embodiment, it is provided that a method for enacting a change of operating modalities of a transportation vehicle is provided. Such a method in this case comprises the following operations: operating at least one display device in the transportation vehicle, which at least partially comprises a screen, the at least one display device comprising at least two operating modes for operator control by a user, automatically providing a triggering signal to the at least one display device, the triggering signal being triggered by at least one trigger event, the trigger event being provided directly or indirectly by the transportation vehicle and the triggering signal triggering a change from a first operating mode to a second operating mode, this change being at least partially indicated to the user by at least one operator alerting signal. In this way it is possible to support the user, for example, a driver of the transportation vehicle, automatically during the respective operating possibilities of the transportation vehicle in the sense of at least one function of the transportation vehicle in the case of various applications during use. The trigger event is provided directly or indirectly by the transportation vehicle, for example, an automated change in the transportation vehicle causing this event directly, without a user or driver becoming active. In this connection, an event is provided indirectly by the transportation vehicle whenever a user previously actively changes at least one object or a state of the transportation vehicle and thereby automatically triggers a trigger event parallel thereto, so that a change in the sense of the method presented is brought about. In particular, by the method presented, a change of operating modalities is indicated to the user in a user-friendly and direct manner, so that the user is clear in every situation to what extent operator control can be achieved. For example, it is illustrated to the driver that a change of the operating mode is taking place, so that subsequently, or even during this process, intuitive and easy operator control in the sense of the respective mode is indicated, and consequently can be used. In other words, it is illustrated to a user by the method presented to what extent during a change of an operating mode a corresponding display device can then be operated, this being automatically brought to the attention of the user by the operator alerting signal. This has the benefit that a respective operating possibility of the transportation vehicle in the case of various applications is not only automatically indicated during use, but the user knows in every situation what kind of operating mode can then be used. Reliable and continual operator control of the transportation vehicle, or at least a function of the transportation vehicle, is thereby made available in an easy way, this being performed dynamically and based on a trigger event. The trigger event may, for example, be in connection with a respective driving mode or a change of something inside or outside the transportation vehicle. It is also conceivable that, above and beyond the operating modes mentioned, other operating modes are additionally provided, for example, standard haptic operator control devices such as, for example, knobs, buttons or the like, which ensure continual operator control in the event of difficulties occurring with the operating modes mentioned.

In a further disclosed embodiment, it is provided that a system for enacting a change of operating modalities of a transportation vehicle is provided. Such a system in this case comprises at least one display device, which at least partially comprises a screen, the at least one display device being operable in at least two operating modes, a first operating mode at least partially comprising a touch control function and a second operating mode at least partially comprising a gesture control function, controllable by a gesture control device, the display device being designed to accept a triggering signal from at least one trigger event. In this case, the trigger event can be provided directly or indirectly by the transportation vehicle. By the triggering signal, a change from the first operating mode to the second operating mode can be triggered in the at least one display device, it being possible for this change to be at least partially indicated to the user by at least one operator alerting signal. The aforementioned benefits to this extent also apply transferably to the system presented.

Further embodiments are provided by the other features mentioned in the subclaims.

Thus, in a further disclosed embodiment, it is provided that the display device provides at least an identical information content for the user in the at least two operating modes. It can in this way be ensured that, independently of a respective operating mode, a user always has access to a respective momentarily displayed content, even during a change. For example, such information content may be in connection with a navigation function of the transportation vehicle. For example, a user would like to retain access to these contents in any operating mode, whether merely visually or else functionally. It is also important in this respect that it is illustrated to the user in every situation to what extent the way of performing operator control on this content is possible. In other words, it is desired that, by the method presented, the user is always informed, even during and after a change of an operating mode, to what extent a displayed content of the display device can be under operator control and which way of performing operator control is in this case possible, or which way of performing operator control is then activated.

In a further disclosed embodiment, it is also provided that the display device in the second operating mode provides for the user at least one further item of information and/or at least one different item of information compared with the information content in the first operating mode. In this way, when there is an indicated change, for example, the operator alerting signal can be at least partially also illustrated to a user as an additional content on the screen of the display device. It is also conceivable that both an independent operator alerting signal and an additional content, for example, in the sense of an additional offer of media for occupants in the transportation vehicle or an additional function, are indicated or provided during and after the change. It is therefore conceivable that, for example, after the change, offers of films or purchasing functions that are then activated and retrievable are, for instance, indicated.

Moreover, in a further disclosed embodiment, it is provided that the first operating mode at least partially comprises a touch control function and the second operating mode at least partially comprises a gesture control function, controllable by a gesture control device. The aforementioned benefits can in this way be achieved even better. For example, today's contents are presented on the screen of the display device as tiles. These contents may be provided, for example, by an infotainment system on a home screen for a user, or for multiple users or occupants of the transportation vehicle. These contents are in this case optimized for touch control, a seat position close to the screen being beneficial, in particular, for a convenient and intuitive way of performing this kind of operator control. In other words, touch control is of benefit, in particular, for a near mode, in which a user is positioned near enough for access. If, however, the user is not in this near mode during use, but is in a position away from the screen, it is important that it is nevertheless illustrated to the user that the displayed contents or functions that are offered on the screen of the display device are still available, but can then be controlled by the operator in a different way. By the method presented, it may be indicated to the user, for example, the driver, in the case of a change that then a way of performing operator control by gestures is possible, or even exclusively possible. To this extent, the method presented provides a solution for achieving the object described here which illustrates to the driver, or generally a user, to what extent an operating mode changes, so that quick and direct operator control is ensured in every situation.

Furthermore, in a further disclosed embodiment, it is provided that at least one characteristic feature of the at least one trigger event causes at least one characteristic feature of the at least one operator alerting signal. Depending on the linking of these characteristic features, it can consequently be indicated to a user particularly well to what extent a changing operating mode is implemented, and correspondingly a respective operator control procedure is then activated and applicable.

In a further disclosed embodiment, it is also provided that the at least one characteristic feature of the at least one trigger event is selected from: duration of the trigger event, speed profile of the trigger event, and the at least one characteristic feature of the at least one operator alerting signal is selected from: duration of the operator alerting signal, speed profile of the operator alerting signal.

These special ways of linking the characteristic features make possible a kind of alert for a user that can be perceived particularly well, so that the user is supplied with the necessary information to implement intuitive and dependable operator control reliably and in every situation.

Moreover, in a further disclosed embodiment, it is provided that the at least one operator alerting signal is provided synchronously with the at least one trigger event. The aforementioned benefits can consequently be achieved even better. It is in this way avoided that too much is expected of a user, since the changing properties are implemented substantially in parallel and uniformly. This is perceived by a user as harmonious, and therefore pleasant, so that this information can be taken in very well, even when actions are performed in parallel.

Furthermore, in a further disclosed embodiment, it is provided that the trigger event is in direct and/or indirect connection with a change of a driving mode of the transportation vehicle. Depending on the driving mode, consequently, a respective operating mode may be favored or even necessary. Also, a respective driving mode may indicate that a corresponding operating mode should then be set, since this change makes more comfort or a dependable way of performing operator control possible for a user. This also means, for example, driving modes based on a respective transportation vehicle speed with respect to a surrounding environment or with respect to directly surrounding transportation vehicles or other road users. For example, it may be beneficial in a specific driving mode to initiate a change to a way of performing operator control by gestures, including head movements or eye movements, since the driving mode requires that the hands are only available to a limited extent for input or generally for operating the display device.

In a further disclosed embodiment, it is also provided that the change of the driving mode of the transportation vehicle is a change from a manual driving mode to a partially or fully automatic driving mode. The method presented can provide the aforementioned benefits particularly well in this application scenario. During a fully automatic driving mode, for example, the driver can change his position in the interior, or the driver is offered the possibility of moving freely in the interior. This may mean that a position of the user away from the screen results, so that then touch control is not possible at all, or only with difficulty. This new positioning may be registered by various forms of technology, for example, by sensors or the like, and a triggering signal may be provided in a way corresponding to this trigger event, and consequently a change of operating modality may be introduced. To this extent, the method presented may also be regarded as or referred to as a method for enacting a change of operating modalities when there is a change of a driving mode from manual driving to automatic driving.

Moreover, in a further disclosed embodiment, it is provided that the trigger event comprises an adjustment of a seat device by the user and/or an adjustment of at least one seat device by the transportation vehicle. For example, a change from manual driving to automatic driving may involve the adjustment of the seat or generally a seat device from a seat position near the screen to a seat position away from the screen. It may be provided that this change already represents the trigger event and a trigger event is correspondingly triggered. In this sense, a change of operating modality is therefore then initiated, a user being correspondingly informed of this, so that it is clear to what extent a way of performing operator control is then possible or is provided. In this case, it is an aim of the method presented that the driver or the user does not have to change the mode himself and can easily deduce the change of the operating modes on the basis of the seat position. In other words, for example, a seat adjustment makes possible an automatic change from one operating mode to another operating mode. A change of the seat position or an adjustment of the seat device may in this case be provided in any direction, so that a new position, for example, a position away from the screen, correspondingly results. For example, a turning of the seat device about a substantially centrally provided axis of rotation may similarly lead to a position away from the screen. Also merely the adjustment of a part or a component of the seat device may be understood as an adjustment of the seat device. Thus, a component may be, for example, a seat unit or a backrest element of such a seat device.

Furthermore, in a further disclosed embodiment, it is provided that the adjustment is implemented along a horizontal plane in the longitudinal axis of the transportation vehicle from a position near the screen to a position away from the screen. The aforementioned benefits can in this way be achieved even better.

Furthermore, in a further disclosed embodiment, it is provided that the operator alerting signal is optical and/or acoustic. In this way, it can be made possible very well to indicate respective operating possibilities of the transportation vehicle in the case of various applications during use automatically to a user. Optical and acoustic signals can in this case be processed well by a user, and consequently can be registered logically correctly, so that a change is reliably perceived and a corresponding way of performing operator control can be used at all times in an accordingly executable manner.

Moreover, in a further disclosed embodiment, it is provided that the operator alerting signal is indicated optically as at least one semitransparent symbol on the screen of the display device and/or as an at least partial change of a mode of representing the image screen contents on the screen of the display device. During a change of the operating mode and while a user has visual contact with the screen, a reliable operator alerting signal can in this way be automatically sent. In addition, the operator alerting signal consequently also has an additional function, it being possible for this function to be perceived directly as the semitransparent symbol or by the change and/or animation of this symbol, and consequently a corresponding interpretation by the user.

Finally, in a further disclosed embodiment, it is provided that the triggering signal triggers at least for a time a change of the display mode in the at least one screen. This may be, for example, an illuminated border of individual elements or contents shown on the screen.

Unless otherwise stated in an individual case, the various embodiments mentioned in this application can be combined with one another.

Figure 1:
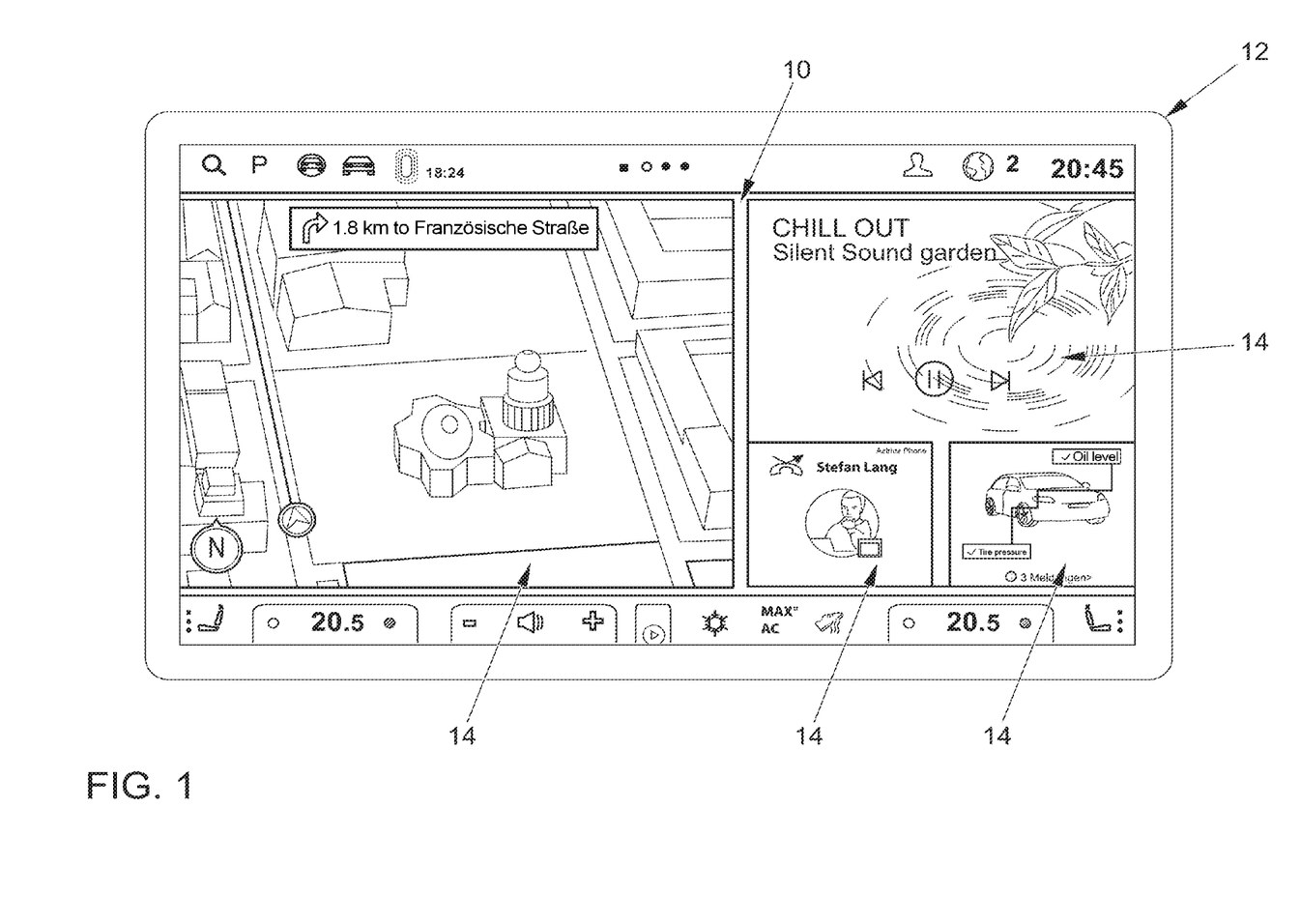
FIG. 1 shows a detail of a screen of a display device in a first operating mode.

FIG. 1 shows a detail of a screen 10 of a display device 12 in a first operating mode. This first operating mode may, for example, make touch control possible for a user. The contents represented on the screen 10, which are shown as individual first tiles 14, can be selected by touch or be treated in any other way by touch by the user, which may be, for example, the driver of the transportation vehicle, not represented any more specifically, or another occupant in the transportation vehicle. This arrangement of the contents may be provided, for example, as a home screen that is standardized and definable by the user, the representation that is shown showing one of many possible options. This kind of representation may be associated with a near mode, which is therefore displayed on the screen whenever the user is positioned near enough to the display device 12 and the screen 10 so that touch control is possible.

Figure 2:
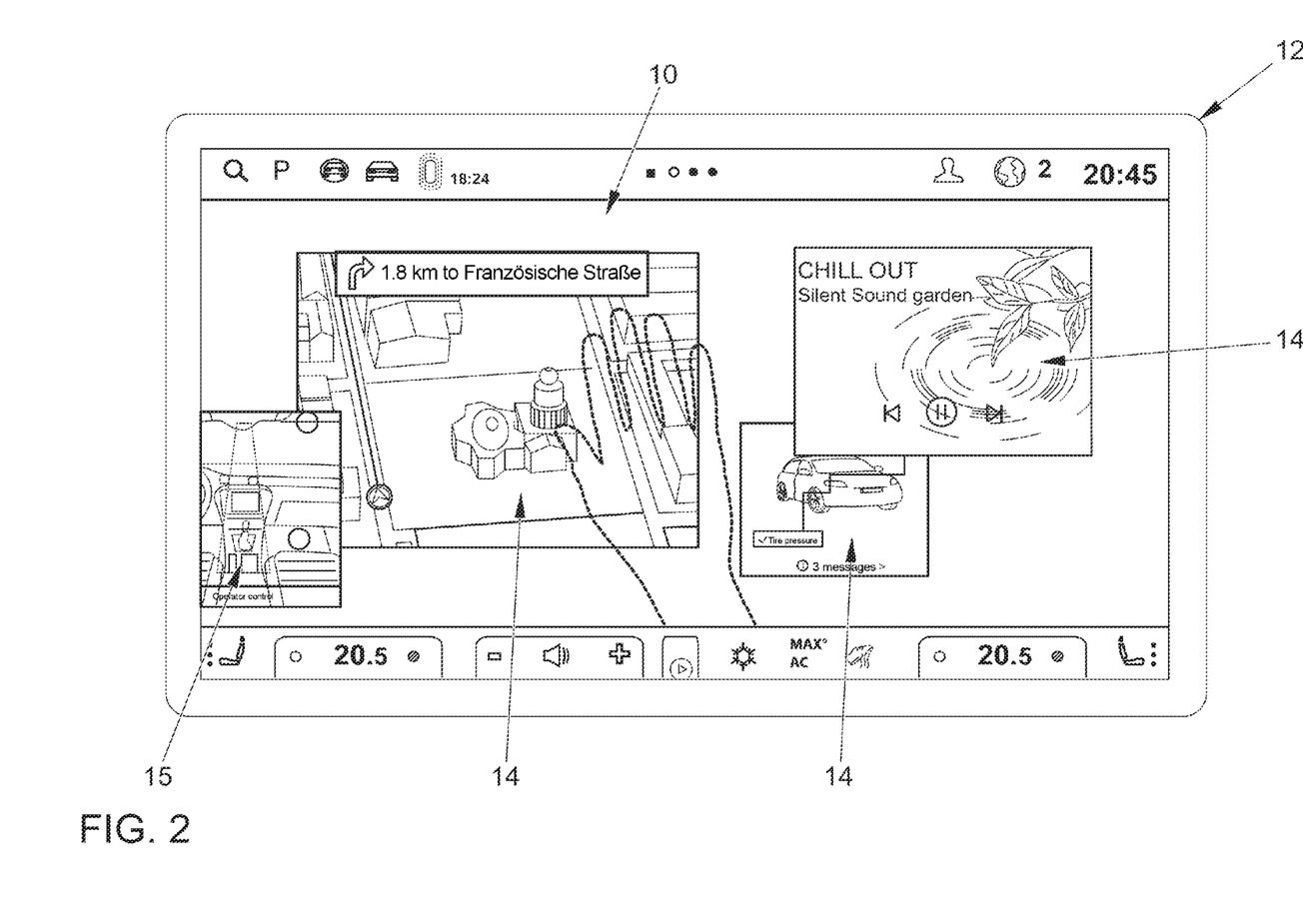
FIG. 2 shows a detail of a screen of a display device during a first state of a change from a first operating mode to a second operating mode.

FIG. 2 shows a detail of a screen 10 of a display device 12 during a first state of a change from a first operating mode to a second operating mode. In this case, a mode of representing the contents is ended, the first tiles 14 being retained however. Accordingly, the structure is deconstructed, the form of representation by the first tiles 14 being retained and the first tiles 14 merely rearranged in their positioning in relation to one another. This may be implemented as follows: if the display device 12 receives a triggering signal from a trigger event that is not represented any more specifically, the first operating mode is changed to a second operating mode. In this option, the user is first alerted to this change, in that the way of representing the contents, here as the first tiles 14, changes. In other words, an operator alerting signal is provided here by a changed mode of representation of the screen contents. The user recognizes this change and is thereby made aware of the changing operating mode. In addition, a second tile 15, with at least one new item of information, appears. The second tile pushes into the visible region of the screen 10, coming from the left to the right with reference to the plane of the image. On this second tile 15, the user sees, for example, a summary of the second operating mode with corresponding alerts to the way in which operator control is performed. In the example shown in FIG. 2, the content of the second tile 15 indicates gesture control by a gesture control device. It is conceivable that, in an option that is not shown any further, other ways of representation or even other operating modes are in this way also included. It is also conceivable that, above and beyond the operating modes mentioned, other operating modes are additionally provided, for example, standard haptic operator control devices such as, for example, knobs, buttons or the like, which ensure continual operator control in the event of difficulties occurring with the operating modes mentioned.

Figure 3:
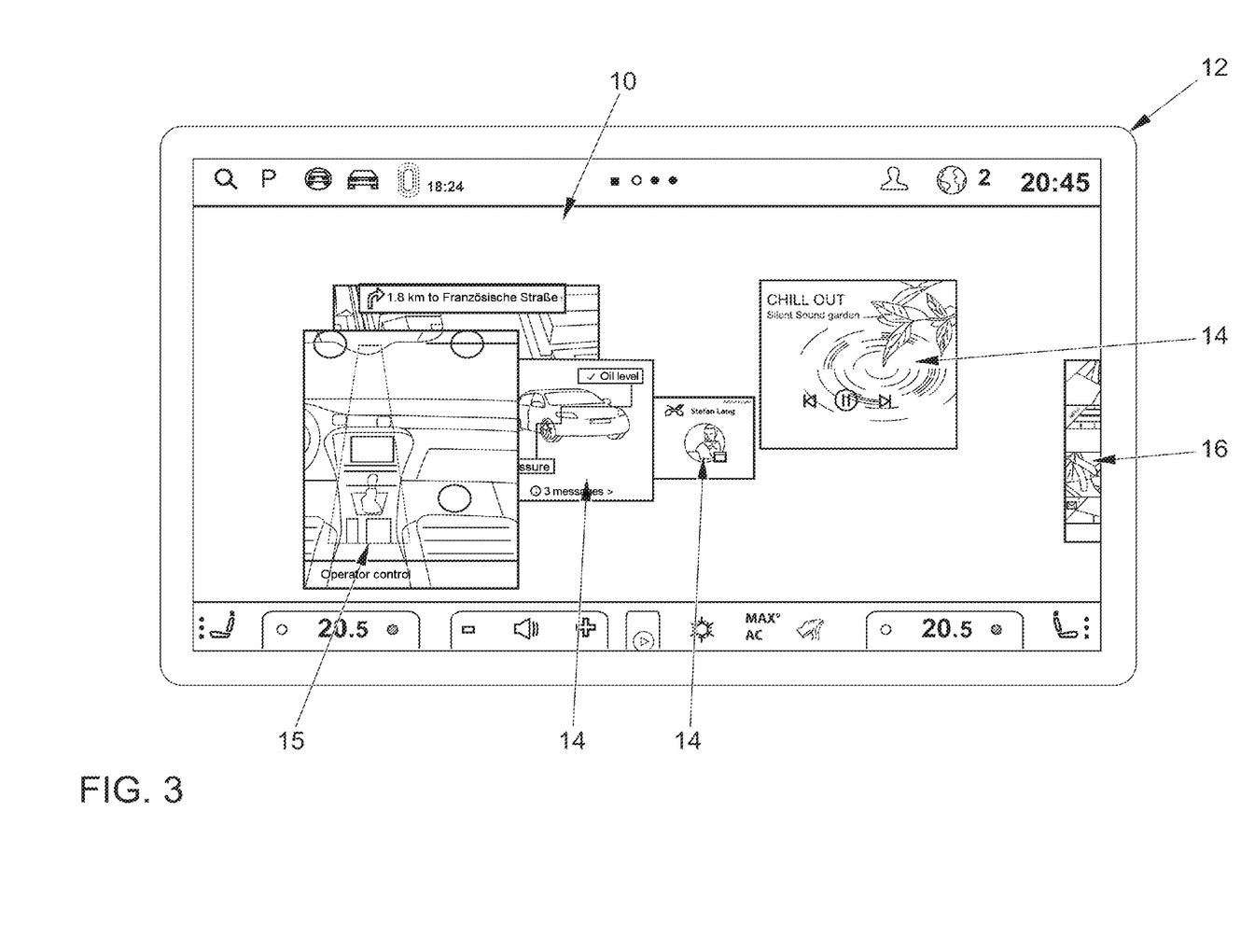
FIG. 3 shows a detail of a screen of a display device during a second state of a change from a first operating mode to a second operating mode.

FIG. 3 shows a detail of a screen 10 of a display device 12 during a second state of a change from a first operating mode to a second operating mode. This is a continuation of the process described in FIG. 2. The second tile 15 is now shown in its entirety and the user can see there an operating instruction for the second operating mode. Moreover, a further new third tile 16, with a further content, comes into the visible region of the screen 10, coming from the right with reference to the plane of the image. This third tile 16 may, for example, contain a media portal. Furthermore, it can be seen well in FIG. 3 to what extent a rearrangement of the tiles 14, 15, 16 takes place.

Figure 4:
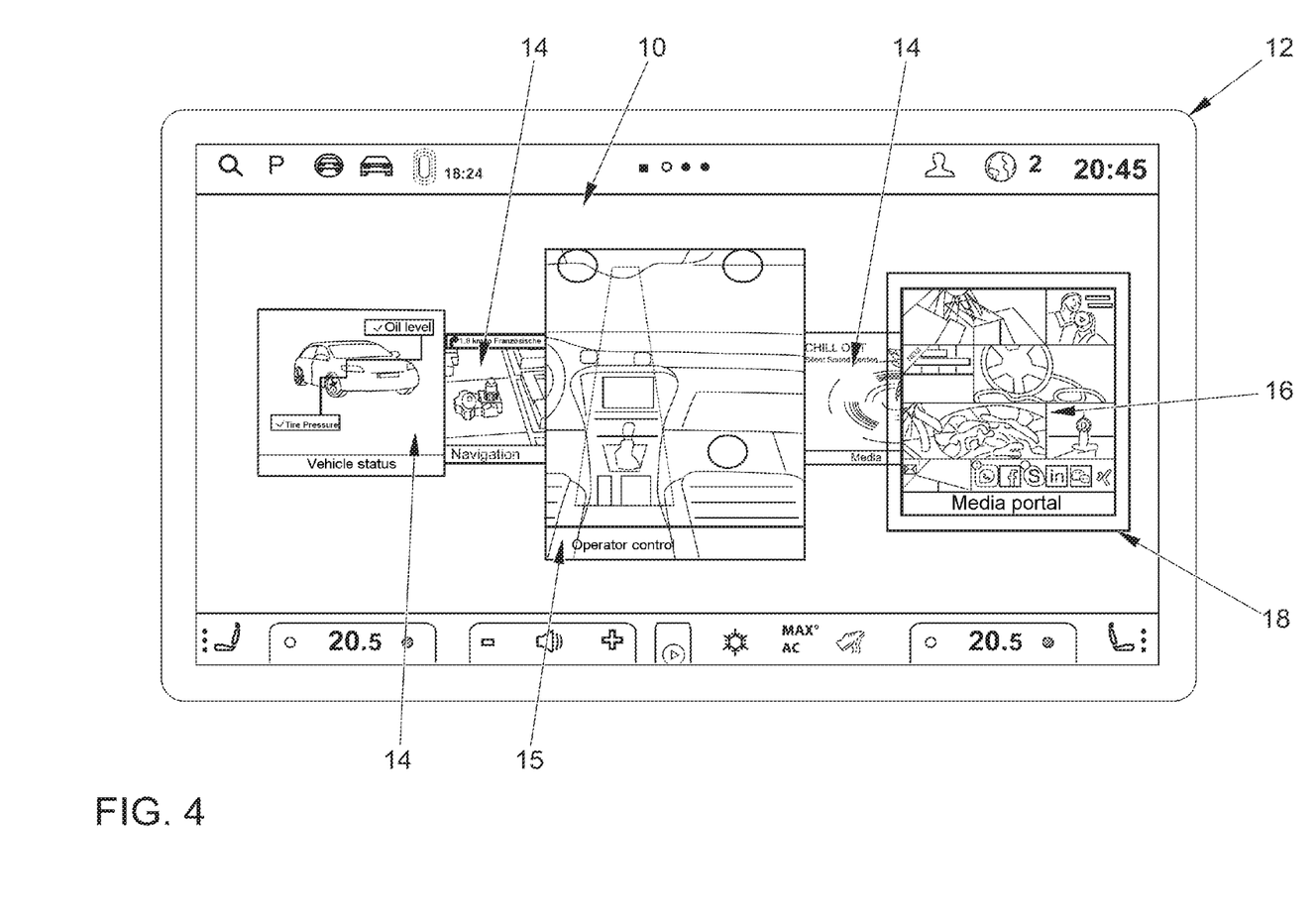
FIG. 4 shows a detail of a screen of a display device during a third state of a change from a first operating mode to a second operating mode.

FIG. 4 shows a detail of a screen 10 of a display device 12 during a third state of a change from a first operating mode to a second operating mode. This is a continuation of the process described in FIGS. 2 and 3. The second tile 15 is now shown in its entirety in the middle and the user can consequently see there very centrally an operating instruction for the second operating mode. Moreover, the further new third tile 16, with a further content, has now moved in its entirety into the visible region of the screen 10. Furthermore, it can be seen well in FIG. 4 to what extent a rearrangement of the tiles 14, 15, 16 takes place. In this case, the second and third tiles 15, 16 may at least temporarily be shown enlarged in comparison with the first tiles 14, which were already shown in the first operating mode. Accordingly, in FIG. 4 these first tiles 14 have moved to the background of the screen 10, so that greater attention of the user is drawn to the second and third tiles 15, 16. The third tile 16 is in this case surrounded by an illuminated frame 18, in this way to direct the attention of the user even better to it.

Figure 5:
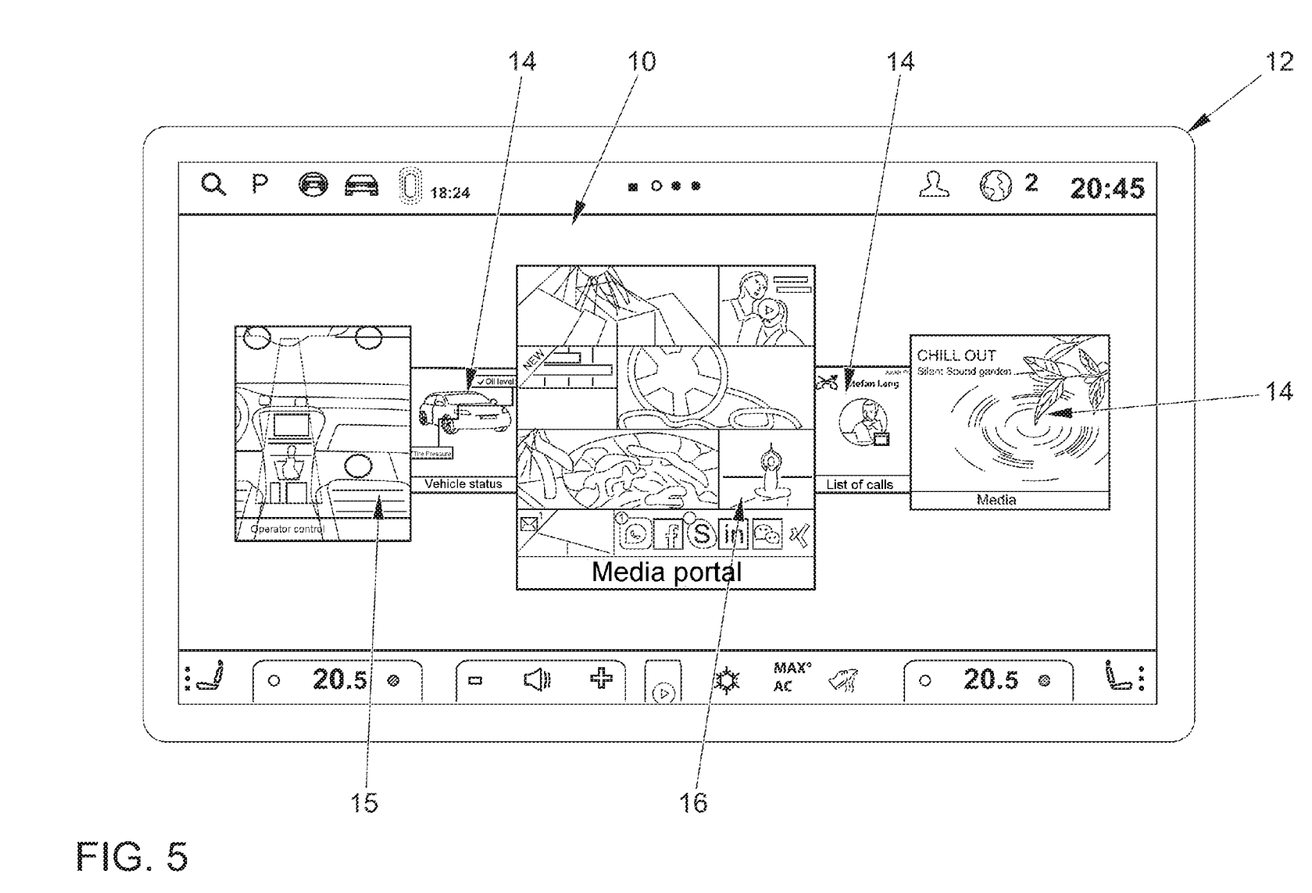
FIG. 5 shows a detail of a screen of a display device during a fourth state of a change from a first operating mode to a second operating mode.

FIG. 5 shows a detail of a screen 10 of a display device 12 during a fourth state of a change from a first operating mode to a second operating mode. This is a continuation of the process described in FIGS. 2, 3 and 4. A change from a near mode to a distant mode is accordingly continued, with reformatting of the contents.

Figure 6:
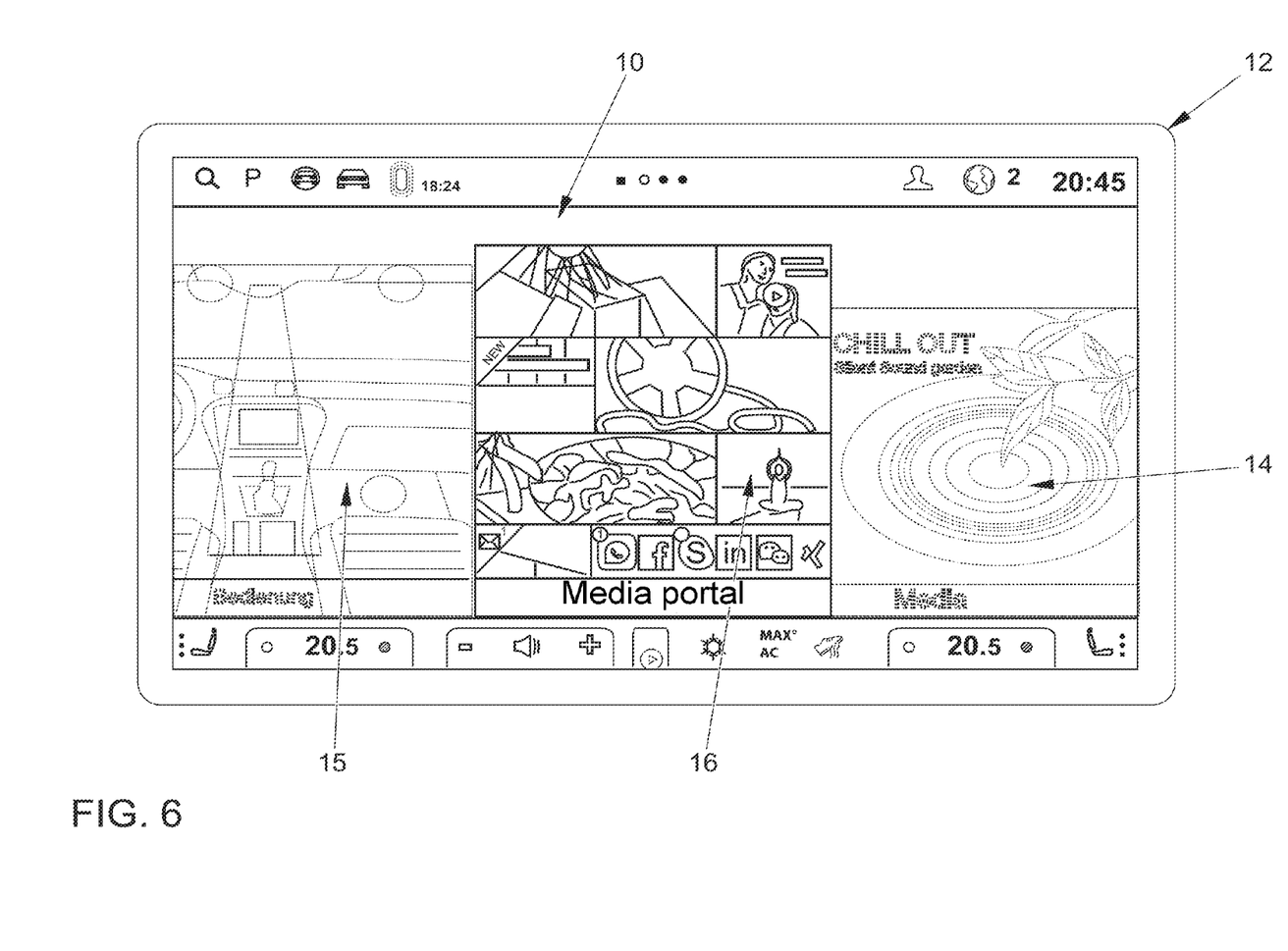
FIG. 6 shows a detail of a screen of a display device during a fifth state of a change from a first operating mode to a second operating mode.

FIG. 6 shows a detail of a screen 10 of a display device 12 during a fifth state of a change from a first operating mode to a second operating mode. This is a continuation of the process described in FIGS. 2, 3, 4 and 5. A change from a near mode to a distant mode achieves, for example, the end state shown in FIG. 6. Accordingly, a state of the ending of the reformatting, and consequently an exemplary final display in the distant mode, is shown. It is conceivable that this final display is provided in a user-defined manner in all other ways.

Figure 7:
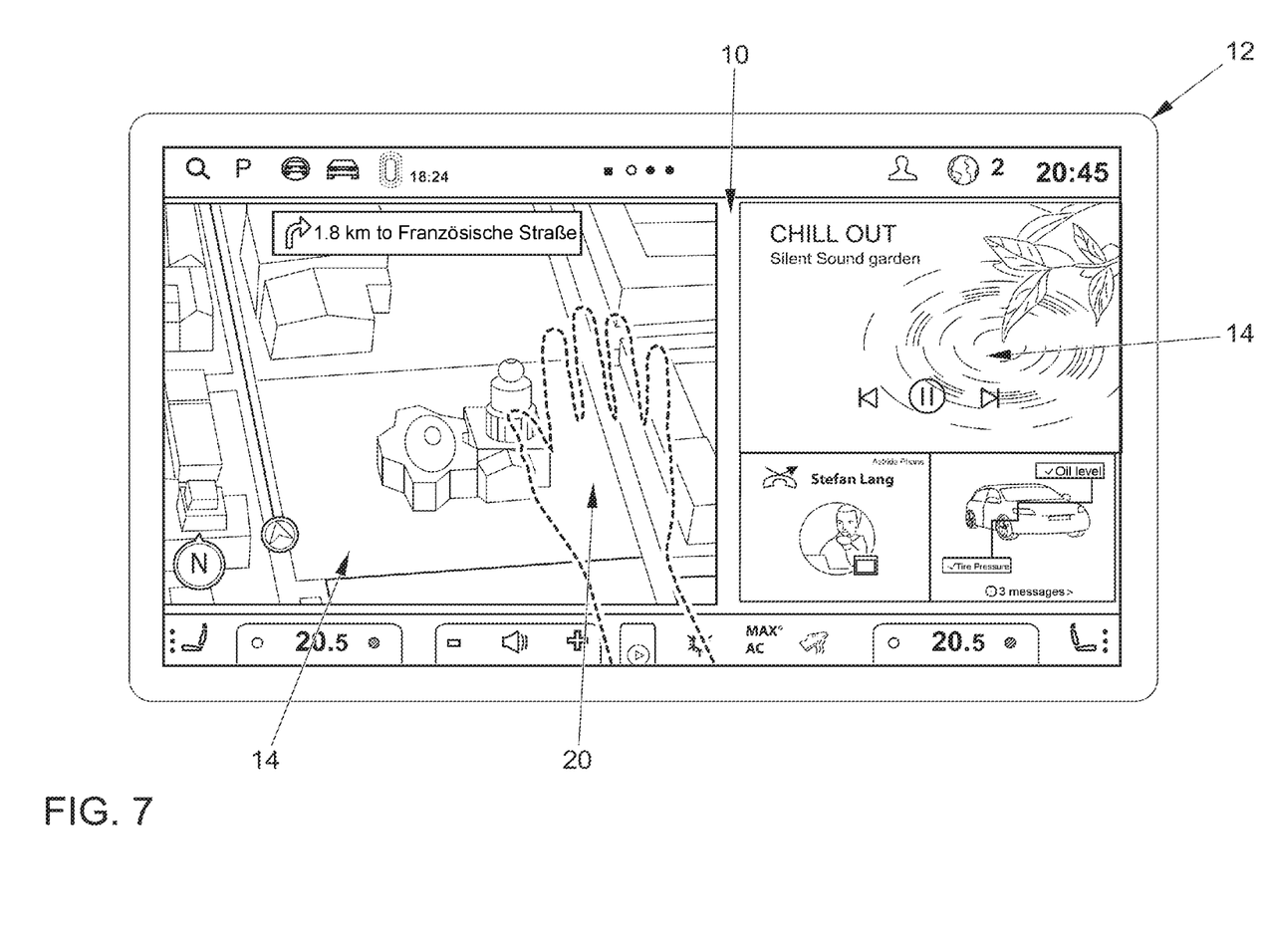
FIG. 7 shows a detail of a screen of a display device in a second operating mode with an operator alerting signal.

FIG. 7 shows a detail of a screen 10 of a display device 12 in a second operating mode with an operator alerting signal as a semitransparent symbol 20. The semitransparent symbol 20 can be seen here as a schematic representation of a hand. In other words, the optical enactment of the change of operating mode is implemented here with an optical operator alerting signal, the hand shown illustrating to a user to what extent the second operating mode functions by gesture control. It is proposed for this that the semitransparent symbol 20, such as the hand, is shown at least partially in an animated manner, it being conceivable that an image in the background can be at least partially visually recognized through the semitransparent symbol 20. Therefore, for a time there is shown on the screen 10 a hand, or a semitransparent schematically visualized hand, which is performing the previously described deconstruction and reformation of the tile structure by gestures. To this extent, the user already sees during this process to what extent future commands or operator control in general can be performed. The aim is that the driver sees on the basis of the hand movement and the changes of the screen contents by which gestures the elements of the infotainment can be operated. This is intended to facilitate operator control of the distant mode by gestures. For example, in FIG. 7 the hand is shown such that it represents a stopping gesture for ending. The hand in this case moves toward the screen, and it is in this way illustrated to the user that this gesture causes a stop.

Figure 8A:
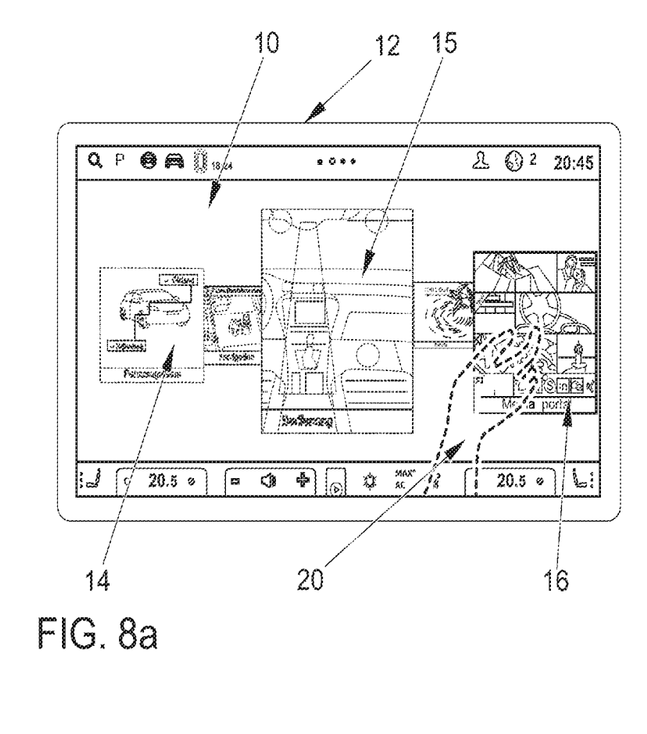
FIG. 8a shows a further detail of a screen of a display device in a second operating mode with an operator alerting signal.

FIG. 8a shows a further detail of a screen 10 of a display device 12 in a second operating mode with an operator alerting signal. The semitransparent symbol 20, which once again can be seen as a schematic representation of a hand, reaches out in FIG. 8a, moving to the right with reference to the plane of the image.

Figure 8B:
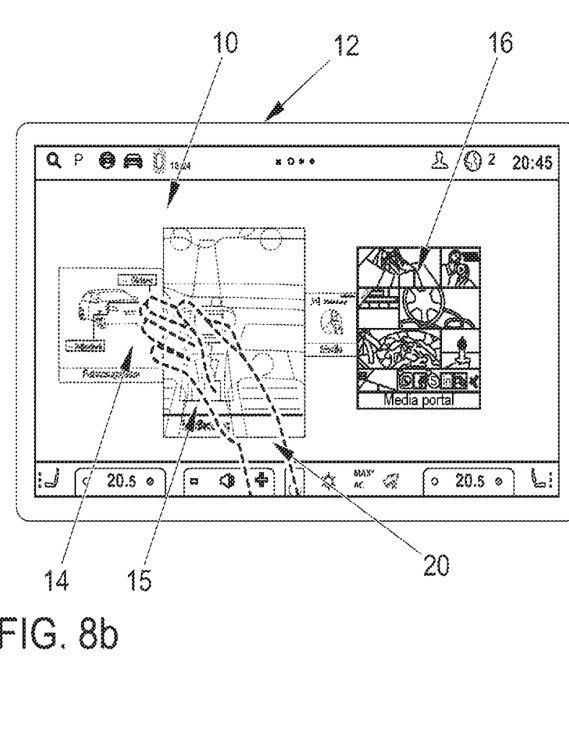
FIG. 8b shows a further detail of a screen of a display device in a second operating mode with an operator alerting signal.

FIG. 8b shows a further detail of a screen 10 of a display device 12 in a second operating mode with an operator alerting signal. The semitransparent symbol 20, such as the hand, is now moving to the left with reference to the plane of the image. This swiping gesture (from right to left) may, for example, illustrate the carousel-like rearrangement of the tiles 14, 15, 16. In other words, the tiles 14, 15, 16 may be shown as rotating, one or more being correspondingly activated in the foreground, and consequently able to be operated or changed by the user.

Figure 9A:
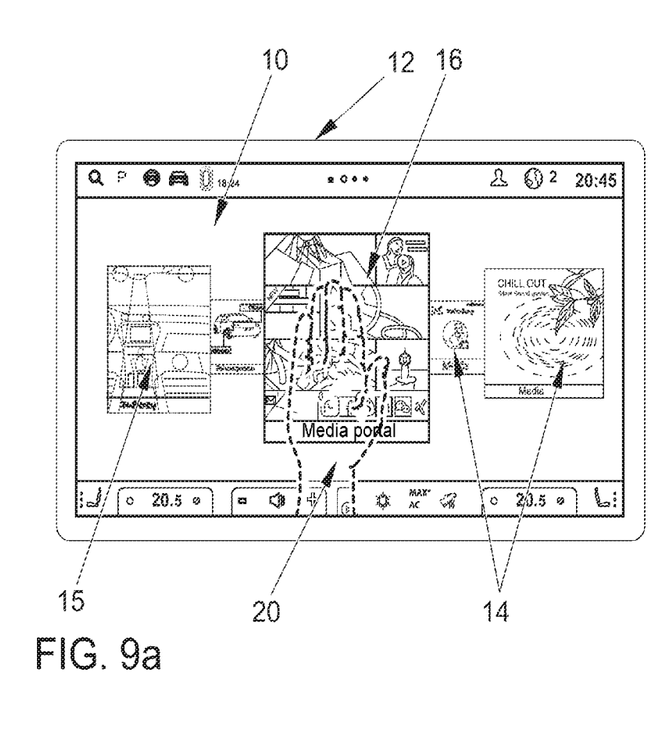
FIG. 9a shows a further detail of a screen of a display device in a second operating mode with an operator alerting signal.

FIG. 9a shows a further detail of a screen 10 of a display device 12 in a second operating mode with an operator alerting signal. Here, the semitransparent symbol 20, which once again can be seen as a schematic representation of a hand, is shown in a confirming gesture. In this case, the hand is initially facing toward a front region of the content on the screen 10 in a half-open position.

Figure 9B:
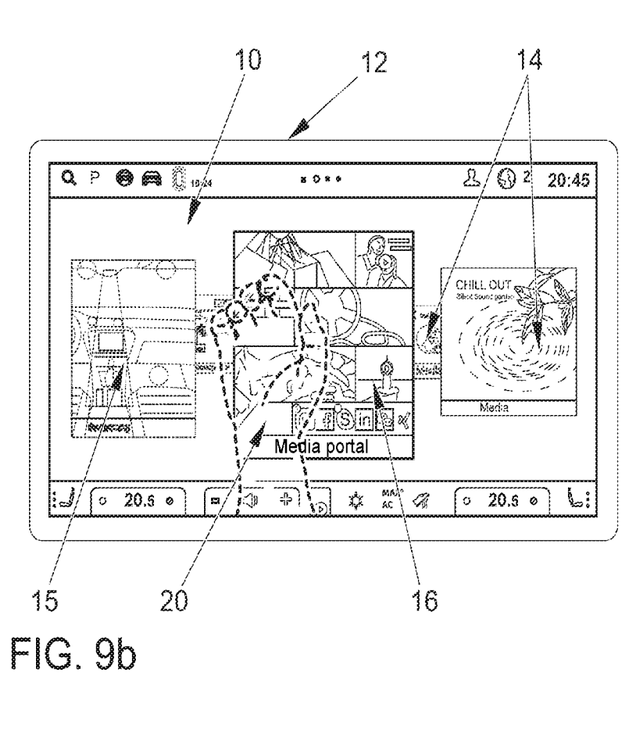
FIG. 9b shows a further detail of a screen of a display device in a second operating mode with an operator alerting signal.

FIG. 9b shows a further detail of a screen 10 of a display device 12 in a second operating mode with an operator alerting signal. This continuation of FIG. 9a accordingly comprises a movement of the hand from the screen 10 toward the user. In this way, for example, a desired content can be opened.

Figure 10:
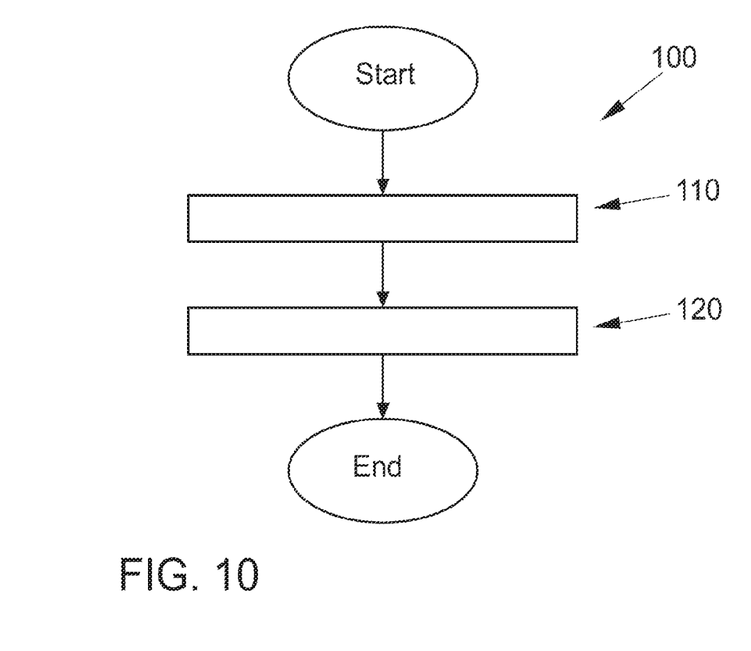
FIG. 10 shows a flow diagram of a method for enacting a change of operating modalities of a transportation vehicle.

FIG. 10 shows a flow diagram 100 of a method for enacting a change of operating modalities of a transportation vehicle 22. In a first operation at 110, in this case at least one display device 12 in a transportation vehicle 22 is operated. The display device 12 in this case at least partially comprises a screen 10, the at least one display device 12 comprising at least two operating modes for operator control by a user. In a second operation at 120, a triggering signal is automatically provided to the at least one display device 12, the triggering signal being triggered by at least one trigger event, the trigger event being provided directly or indirectly by the transportation vehicle 22 and the triggering signal triggering a change from a first operating mode to a second operating mode, this change being at least partially indicated to the user by at least one operator alerting signal.

Figure 11:
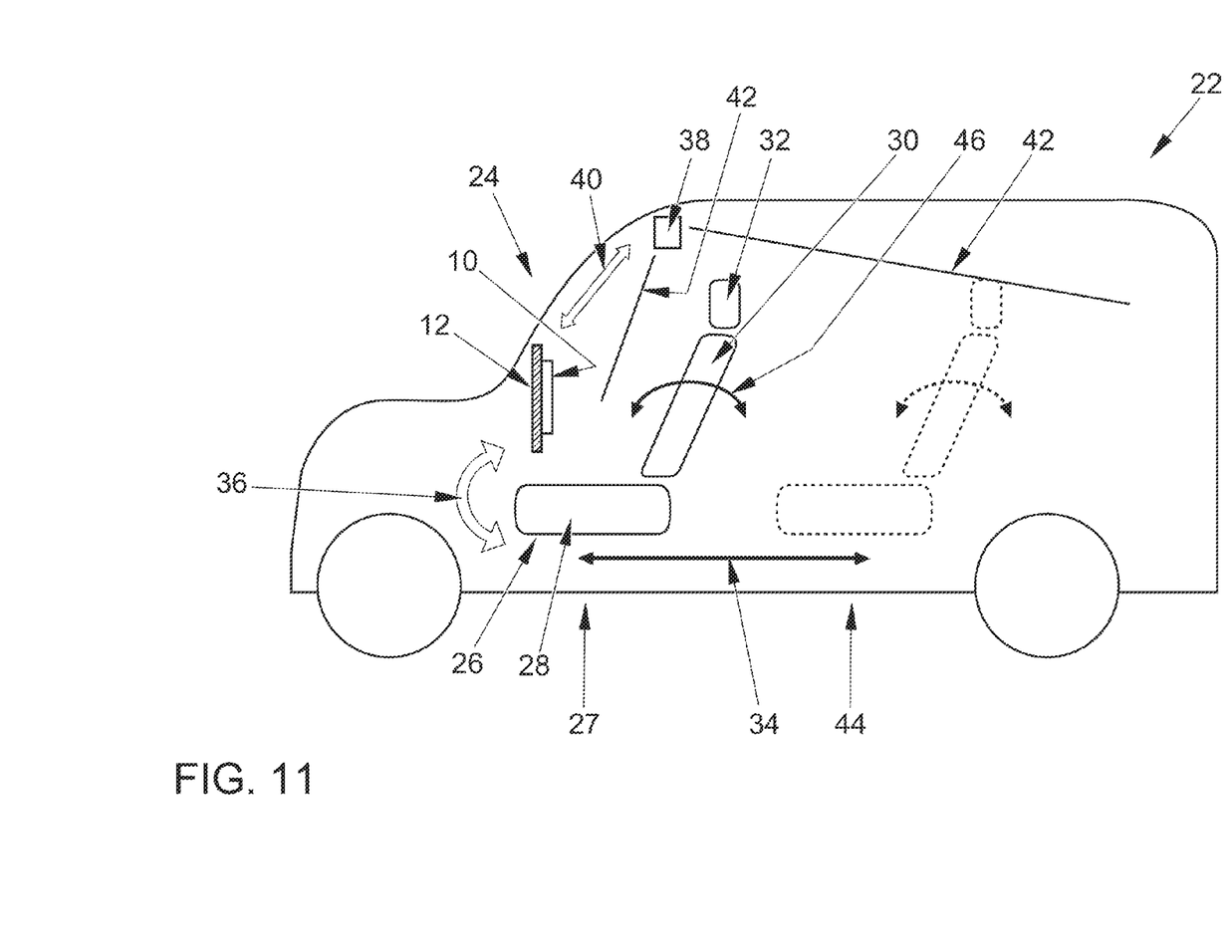
FIG. 11 shows a sectional view of a transportation vehicle with a system for enacting a change of operating modalities of a transportation vehicle.

FIG. 11 shows a sectional view of a transportation vehicle 22 with a system 24 for enacting a change of operating modalities of the transportation vehicle 22. A display device 12 with a screen 10 is in this case shown in the front region of the transportation vehicle 22, the arrangement being shown substantially in a region of a dashboard. It is conceivable that this arrangement differs and is arranged in any other position, optionally within the field of view of a user. Furthermore, a seat device 26 is shown on the right (with reference to the plane of the image) alongside the display device 12. This seat device 26, which may, for example, be a conventional transportation vehicle seat, is in this case shown in a first position 27. This seat device 26 in this case comprises a seat unit 28 on which, for example, a driver can sit, the driver in this case also being at the same time the user of the display device 12. The seat device 26 also comprises a backrest element 30, which is arranged on the seat unit 28. Also arranged on the backrest element 30 is a head restraint 32. A first movement arrow 34 indicates to what extent the seat device 26 can be displaced to the right with reference to the plane of the image. In this case, not only the seat unit 28 but also the backrest element 20 and the head restraint 32 are moved. To put it another way, the seat device 26 can be moved from a position near the screen to a position away from the screen. A first block arrow 36 illustrates the functional connection between the seat device 26 and the display device 12 with the screen 10. To this extent, the movement of the seat device 26 may be regarded as a trigger event, which triggers a change of a change of operating modalities in the case of the display device 12 with the screen 10, this change being accompanied by an operator alerting signal for the user. A first operating mode of the display device 12 with the screen 10 may be, for example, on the basis of a touch control function and a second operating mode of the display device 12 with the screen 10 may be, for example, on the basis of a gesture control function. The gesture control function may, for example, be realized by a gesture control device 38 shown, a second block arrow 40 indicating the functional connection between the gesture control device 38 and the display device 12 with the screen 10. Two lines 42 show in this case, for example, a space within which actions can be performed for the gesture control device 38. This in this case also comprises a second seat position 44 of the seat device 26, this second seat position 44 being indicated by using dashed lines for representing the seat device 26. When the transportation vehicle seat 26 is moved into the second position 44, the operating mode automatically changes and the gesture control device 38 can then, for example, also be used by the user in the position away from the screen here. It is conceivable that equally just a change of the backrest element 30 of the seat device 26 in the sense of the second movement arrow 46 is sufficient to bring about the aforementioned change. To this extent, the adjusting of the backrest element 30 is then already interpreted as a trigger event and a change is initiated. For example, it is conceivable that the changing of the backrest element 30 moves the driver from a position near the screen to a position away from the screen, so that the first operating mode can no longer be executed, or only with difficulty and discomfort. In an extreme case, the changing of the backrest element 30 leads to an almost lying position of the driver; this position could be chosen, for example, in the stationary mode of the transportation vehicle 22 or in the case of partially or fully automated driving of the transportation vehicle 22.

LIST OF REFERENCE SIGNS

10 Screen
12 Display device
14 First tile
15 Second tile
16 Third tile
18 Illuminated frame
20 Semitransparent symbol
22 Transportation vehicle
24 System
26 Transportation vehicle seat
27 First seat position
28 Seat unit
30 Backrest element
32 Head restraint
34 First movement arrow
36 First block arrow
38 Gesture control device
40 Second block arrow
42 Line
44 Second seat position
46 Second movement arrow
100 Flow diagram
110 First operation
120 Second operation

The invention claimed is:

1. A system for a transportation vehicle, the system comprising:
a display device including a screen;
a touch sensor communicatively coupled to the display device and configured to detect a touch of a user of the transportation vehicle and alter graphical content displayed on at least a portion of the screen based on the detected touch;
a gesture control device communicatively coupled to the display device and configured to detect a gesture of the user of the transportation vehicle and alter graphical content displayed on at least a portion of the screen based on the detected gesture; and
a seat having a backrest and a base and positioned in one of a first position and a second position relative to the screen, wherein, in the first position, the seat is positioned relative to the screen to enable the user to touch the screen to control the system, wherein, in the second position, the seat is positioned relative to the screen for user control of the system without touching the screen, wherein the display device is configured to operate in one of a first operating mode and a second operating mode, wherein, during the first operating mode, at least a portion of the screen is controllable by the user using a touch control function, wherein, during the second operating mode, the screen is controllable by the user using a gesture,
wherein a control device of the transportation vehicle is configured to
in response to at least one trigger event provided directly or indirectly by the transportation vehicle, initiate a change in the operating mode of the display device from the first operating mode to the second operating mode such that the screen is controllable by the gesture control function and initiate a change of the position of the seat from the first position to the second position by initiating movement of the base of the seat along a longitudinal axis relative to vehicle interior, and
transmit to the user at least one alerting signal indicating the change in the operating mode of the display device, wherein at least one of a first plurality of movable tiles displayed during the second operating mode is different from each of a second plurality of movable tiles displayed during the first operating mode, wherein the at least one of the first plurality of movable tiles includes additional information, and wherein the at least one of the first plurality of movable tiles enters a visible region of the screen from a left side to a right side with reference to a plane of the at least one of the first plurality of movable tiles.

2. The system of claim 1, wherein the display device displays at least identical information content for the user in the first and second operating modes.

3. The system of claim 1, wherein the display device in the second operating mode provides for the user at least one further item of information.

4. The system of claim 1, wherein at least one characteristic feature of the at least one trigger event causes at least one characteristic feature of the at least one alerting signal.

5. The system of claim 4, wherein the at least one characteristic feature of the at least one trigger event is selected from: duration of the trigger event, speed profile of the trigger event, and the at least one characteristic feature of the at least one operator alerting signal is selected from: duration of the operator alerting signal, speed profile of the operator alerting signal.

6. The system of claim 1, wherein the at least one operator alerting signal is provided synchronously with the at least one trigger event.

7. The system of claim 1, wherein the trigger event is in direct and/or indirect connection with a change of a driving mode of the transportation vehicle.

8. The system of claim 7, wherein the change of the driving mode of the transportation vehicle is a change from a manual driving mode to a partially or fully automatic driving mode.

9. The system of claim 1, wherein the operator alerting signal is optical and/or acoustic.

10. The system of claim 1, wherein the alerting signal is indicated optically as at least one semitransparent symbol on the screen of the display device and/or as an at least partial change of a mode of representing the image screen contents on the screen of the display device.

11. The system of claim 1, wherein the triggering signal triggers at least for a time a change of a display mode of the screen.

12. The system of claim 1, wherein the additional information includes information related to user controls available during the second operating mode.

13. The system of claim 1, wherein at least one additional tile enters the visible region of the screen from the right side with reference to the plane of the at least one additional tile, and wherein the at least one additional tile includes information related to a media portal.

14. A method for a transportation vehicle, the method comprising:
operating a display device of the transportation vehicle in a first operating mode, wherein the display device includes a screen, wherein during the first operating mode at least a portion of the screen is controllable by a user of the transportation vehicle using a touch control function;

operating a seat of the transportation vehicle in a first position relative to the screen to enable the user to touch the screen, wherein the seat includes a backrest and a base operatively coupled thereto; and in response to at least one trigger event, initiating a change of the position of the seat from the first position to a second position, wherein, in the second position, the seat is positioned relative to the screen for user control of the system without touching the screen, and wherein initiating the change to the second position includes initiating movement of the base of the seat along a longitudinal axis relative to vehicle interior, initiating a change of the operating mode of the screen from the first operating mode to a second operating mode, wherein, during the second operating mode, the screen is controllable using a gesture control function, wherein controlling using the gesture control function includes detecting, by a gesture control device, a gesture of the user and altering graphical content displayed on the screen based on the detected gesture, and wherein at least one of a first plurality of movable tiles displayed during the second operating mode is different from each of a second plurality of movable tiles displayed during the first operating mode, wherein the at least one of the first plurality of movable tiles includes additional information, and wherein the at least one of the first plurality of movable tiles enters a visible region of the screen from a left side to a right side with reference to a plane of the at least one of the first plurality of movable tiles, and transmitting to the user at least one alerting signal indicating the change in the operating mode.

15. The method of claim 14, wherein the display device displays at least identical information content for the user in the first and second operating modes.

16. The method of claim 14, wherein the display device in the second operating mode provides for the user at least one further item of information.

17. The method of claim 14, wherein at least one characteristic feature of the at least one trigger event causes at least one characteristic feature of the at least one operator alerting signal.

18. The method of claim 17, wherein the at least one characteristic feature of the at least one trigger event is selected from: duration of the trigger event, speed profile of the trigger event, and the at least one characteristic feature of the at least one operator alerting signal is selected from: duration of the operator alerting signal, speed profile of the operator alerting signal.

19. The method of claim 14, wherein the at least one alerting signal is provided synchronously with the at least one trigger event.

20. The method of claim 14, wherein the trigger event is in direct and/or indirect connection with a change of a driving mode of the transportation vehicle.

21. The method of claim 20, wherein the change of the driving mode of the transportation vehicle is a change from a manual driving mode to a partially or fully automatic driving mode.

22. The method of claim 14, wherein the alerting signal is optical and/or acoustic.

23. The method of claim 22, wherein the alerting signal is indicated optically as at least one semitransparent symbol on the screen of the display device and/or as an at least partial change of a mode of representing the image screen contents on the screen of the display device.

24. The method of claim 14, wherein the triggering signal triggers at least for a time a change of the display mode in the screen.

25. The method of claim 14, wherein the additional information includes information related to user controls available during the second operating mode.

26. The method of claim 14, wherein at least one additional tile enters the visible region of the screen from the right side with reference to the plane of the at least one additional tile, and wherein the at least one additional tile includes information related to a media portal.

* * * * *